UNITED STATES PATENT OFFICE.

GEORGE R. RICHES AND WILLIAM C. PIVER, OF HOBOKEN, NEW JERSEY.

PROCESS OF MAKING CALCIUM ARSENATE.

1,237,815. Specification of Letters Patent. Patented Aug. 21, 1917.

No Drawing. Application filed October 27, 1916. Serial No. 128,002

*To all whom it may concern:*

Be it known that we, GEORGE R. RICHES, a subject of the King of Great Britain, and WILLIAM C. PIVER, a citizen of the United States, and resident of Hoboken, county of Hudson, and State of New Jersey, have invented certain new and useful Improvements in Processes of Making Calcium Arsenate, of which the following is a specification.

This invention relates to a process for the manufacture of calcium arsenate.

In the commercial production of calcium arsenate for use as an insecticide, etc., the chemical reaction of treating arsenic acid with "lime-water" according to the following reaction, is made use of:

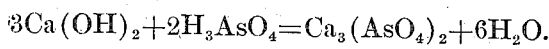

$$3Ca(OH)_2 + 2H_3AsO_4 = Ca_3(AsO_4)_2 + 6H_2O.$$

Although this reaction is carried out in the main part, and forms the basis of the operation, a very troublesome salt of calcium and arsenic is also formed, which salt is soluble in water and is known as calcium tetra hydric arsenate, having a formula, $CaH_4(AsO_4)_2$. When the insoluble calcium arsenate $Ca_3(AsO_4)_2$ is formed, the molecules of the calcium arsenate occlude the acid salt, enveloping it in such a manner as to render its removal by washing or the usual methods of purification impossible. Upon drying the precipitate this soluble occluded calcium tetra hydric arsenate, due to either the crumbling of the insoluble envelop of calcium arsenate or the crystallization and consequent expansion of the occluded calcium tetra hydric arsenate, or both, causes the soluble arsenic compound to be exposed to the action of water or any other solvent which may be brought into contact with it. This condition renders the calcium arsenate useless for insecticidal purposes because of the presence of soluble arsenic salts.

Although we have not been able to prevent the formation of this soluble calcium tetra hydric arsenate, we have found that the addition of certain electrolytes in the solutions at the time of reaction, will prevent the occlusion of the soluble arsenic compound by the precipitated calcium arsenate. Examples of electrolytes which we have found to work satisfactorily for this purpose are sodium hydroxid or calcium nitrate.

We realize that there is nothing new in the principle involved, in the occlusion of soluble compounds by insoluble compounds upon the precipitation of the latter. Barium sulfate occludes many of the soluble compounds of the alkalis and alkali earths, etc., but the occlusion in this case, as in many others, can be prevented by the physical conditions of precipitation being altered, i. e. the proper temperature being reached before precipitation occurs, and the proper consequent digestion of the precipitate at the proper temperature. In the precipitation of the calcium arsenate, however, the physical conditions make only a slight difference in the amount of occluded matter.

It is our impression that the calcium tetra hydric arsenate is in finely divided colloidal condition upon formation, which condition changes upon standing. While in this colloidal condition it is occluded by the insoluble calcium arsenate during the process of precipitation. We do not mean to say that there will be any colloidal calcium tetra hydric arsenate in the final solution, as we do not believe it will remain as a colloid but merely pass through the colloidal state before it becomes ionized.

It is a well known and accepted theory that a colloid is charged electrically opposite to the charge of the liquid in which it is suspended, due to the particles of the colloid coming in contact with the liquid in which it is suspended. It is also accepted that the addition of certain electrolytes into such a colloidal solution often destroys this colloidal state by neutralizing the charge on the colloid and thereby permitting the colloid to either precipitate or ionize. The reaction involved in the precipitation of the calcium arsenate fits this condition exactly. The presence of the electrolyte in solution prevents the colloid from existing in the solution by neutralizing the charge on the colloid as soon as it (the colloid) is formed, thereby rendering it ionized in the solution and preventing the occlusion of the calcium tetra hydric arsenate by the calcium arsenate.

What we claim and desire to secure by Letters Patent is:—

1. The process of making calcium arsenate which consists in the reaction of calcium hydroxid with arsenic acid in the presence of a compound adapted to prevent the occlusion of a soluble compound of calcium and arsenic by the calcium arsenate.

2. The process of making calcium arsenate which consists in the reaction of calcium hydroxid with arsenic acid in the presence of an independent electrolyte adapted to prevent the occlusion of a soluble compound of calcium and arsenic by the calcium arsenate.

3. The process of making calcium arsenate which consists in the reaction of calcium hydroxid with arsenic acid in the presence of sodium hydroxid to prevent the occlusion of a soluble compound of calcium and arsenic by the calcium arsenate.

Signed at the city, county and State of New York this 23rd day of October, 1916.

GEORGE R. RICHES.
WILLIAM C. PIVER.